United States Patent
Prenzel

(10) Patent No.: US 9,777,198 B2
(45) Date of Patent: *Oct. 3, 2017

(54) METHOD FOR PRODUCING COHESIVE POLYACRYLATE ADHESIVE COMPOUNDS WITH A NARROW MOLAR MASS DISTRIBUTION

(71) Applicant: TESA SE, Hamburg (DE)

(72) Inventor: Alexander Prenzel, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/358,577

(22) PCT Filed: Sep. 28, 2012

(86) PCT No.: PCT/EP2012/069292
§ 371 (c)(1),
(2) Date: May 15, 2014

(87) PCT Pub. No.: WO2013/072121
PCT Pub. Date: May 23, 2013

(65) Prior Publication Data
US 2014/0329971 A1  Nov. 6, 2014

(30) Foreign Application Priority Data
Nov. 16, 2011 (DE) ........................ 10 2011 086 503

(51) Int. Cl.
*C08F 220/18* (2006.01)
*C09J 133/08* (2006.01)
*C08F 2/38* (2006.01)

(52) U.S. Cl.
CPC ............... *C09J 133/08* (2013.01); *C08F 2/38* (2013.01); *C08F 220/18* (2013.01); *C08F 2438/03* (2013.01)

(58) Field of Classification Search
CPC ...... C08F 2/38; C08F 220/18; C08F 2438/03; C09J 133/08
See application file for complete search history.

(56) References Cited

U.S. PATENT DOCUMENTS

| | | |
|---|---|---|
| 2003/0068492 A1 | 4/2003 | Husemann et al. |
| 2010/0104864 A1 | 4/2010 | Zoellner et al. |
| 2010/0239778 A1 | 9/2010 | Erwin et al. |
| 2012/0289657 A1 | 11/2012 | Hilf et al. |
| 2012/0309895 A1 | 12/2012 | Schmidt et al. |

FOREIGN PATENT DOCUMENTS

| | | |
|---|---|---|
| DE | 102010001987 A1 | 8/2011 |
| DE | 102010001992 A1 | 8/2011 |
| EP | 1978069 A1 | 10/2008 |
| EP | 1626994 B1 | 7/2009 |
| WO | 9801478 A1 | 1/1998 |
| WO | 9931144 A1 | 6/1999 |
| WO | 2011101175 A1 | 8/2011 |
| WO | 2013072121 A1 | 5/2013 |

OTHER PUBLICATIONS

Sinnwell, S. et al . Chemical Communications 2008 (17) pp. 2052-2054 published online Feb. 2008.*
International Search Report for PCT/EP2012/069292 dated Jan. 4, 2013.
Written Opinion of the International Searching Authority dated Jan. 4, 2013.
German Search Report for DE 10 2011 086 503.9 dated Oct. 1, 2012.
H. Wilcock, et al., "End group removal and modification of RAFT polymers", Polymer Chemistry, 2010, 1, pp. 149-157, UK.
A. J. Inglis, et al., "Ultrafast Click Configuration of Macromolecular Building Blocks at Ambient Temperature", Angewandte Chemie International Edition, Feb. 17, 2009, XP055018786, pp. 2411-2414, Weinheim, Germany.
A.Bousquet, et al., "Synthesis of Comp Polymers via Grafting-Onto Macronolecules Bearing Pendant Diene Groups via the Hetero-Diels-Alder-RAFT Click Concept", Journal of Polymer Science Part A: Polymer Chemistry, Apr. 15, 2010, vol. 48 1773-1781, XP055048351, published online in Wiley InterScience (www.interscience.wiley.com).
L. Nebhani, et al., " Quantification of Grafting Densities Achieved via Modular 'Grafting-to' Approaches onto Divinylbenzene Microspheres", Advanced Function Materials, 20, Jun. 23, 2010, XP055048353, pp. 2010-2020, Weinheim, Germany.
G. Moad, et al., "End-functional polymers, thiocarbonylthio group removal/transformation and reversible addition—fragmentation—chain transfer (RAFT) polymerization", Polym. Int., 60, 2011, pp. 9-25, Wiley Online Library.
CN Office Action for Application CN 201280066512.7 dated Jan. 15, 2015.
English translation of CN Office Action for Application CN 201280066512.7 dated Jan. 15, 2015.

* cited by examiner

Primary Examiner — Irina S Zemel
Assistant Examiner — Jeffrey Lenihan
(74) Attorney, Agent, or Firm — Norris McLaughiln & Marcus PA

(57) ABSTRACT

The invention relates to a method for producing polyacrylate adhesive compounds with a narrow molar mass distribution by means of a radical polymerization and a subsequent increase of the molar masses by reacting with bis- or multi-dienyl compounds, in particular with α,ω-bis-dienyl compounds, in order to increase the cohesion in particular.

18 Claims, No Drawings

METHOD FOR PRODUCING COHESIVE POLYACRYLATE ADHESIVE COMPOUNDS WITH A NARROW MOLAR MASS DISTRIBUTION

This application is a 371 of PCT/EP2012/069292 filed Sep. 28, 2012, which claims priority to the German patent application DE 10 2011 086 503.6 filed Nov. 16, 2011.

The present invention relates to a method for increasing the molecular weight of polyacrylates with a narrow molar mass distribution.

Industrial adhesive tape applications very often use pressure sensitive polyacrylate adhesives. Polyacrylates possess diverse advantages over other elastomers. They are highly stable toward UV light, oxygen, and ozone. Synthetic and natural rubber adhesives usually contain double bonds, which render these adhesives unstable toward the aforementioned environmental influences. Another advantage of polyacrylates is their transparency and their capacity for use across a relatively broad temperature range.

Pressure sensitive polyacrylate adhesives are prepared generally in solution by a free radical polymerization. Generally speaking, the polyacrylates in solution are coated via a coating bar onto the carrier material in question, and are subsequently dried. In order to raise the cohesion, the polymer is generally crosslinked. Curing proceeds thermally, by UV crosslinking (ultraviolet radiation), or by EB curing (EB: electron beams). The operation described is relatively costly and inconvenient and is environmentally objectionable, since the solvent is generally not recycled, and a high level of organic solvent consumption entails a high environmental burden.

It is very difficult, moreover, to produce pressure sensitive adhesive tapes with high coatweight without bubbles.

A hotmelt operation affords an alternative process that offers significant improvements in terms of the abovementioned problems. In this hotmelt process, the pressure sensitive adhesive (PSA) is applied in the melt to the carrier material.

This new technology, however, also entails restrictions. Before the coating operation, the solvent is removed from the PSA in a drying extruder. The drying procedure involves a relatively high temperature and shearing exposure, causing high damage particularly to high molecular mass polyacrylate PSAs. The acrylate PSA gels, or the low molecular mass fraction is increased greatly as a result of molecular weight reduction. Both effects are undesirable, being deleterious to use. Either the adhesive can no longer be coated, or else there are changes in the technical properties of the PSA, since, for example, on exposure of the adhesive to a shearing force, the low molecular mass fractions act as lubricants and so lead to premature failure of the adhesive.

A solution to avoiding these disadvantages is offered by polyacrylate adhesives with a low average molecular weight and narrow molecular weight distribution. Here, the polymerization procedure greatly reduces the proportion of low molecular mass and high molecular mass molecules in the polymer. The removal of the high molecular mass fractions lowers the flow viscosity, and the adhesive exhibits less of a tendency to gel. The lowering in the low molecular mass fraction reduces the number of oligomers that lower the shear strength of the PSA.

A variety of polymerization techniques are suitable for the production of low molecular mass PSAs. State of the art is the use of chain transfer agents (CTAs), such as of alcohols or thiols, for example. These CTAs reduce the molecular weight, but broaden the molecular weight distribution.

Another control polymerization technique employed is that of Atom Transfer Radical Polymerization, ATRP, where preferably monofunctional or difunctional secondary or tertiary halides are used as initiator, and certain metal complexes are used for the purpose of abstracting the halide or halides. As a side-effect, however, the metal catalysts employed generally influence the aging of the PSAs in a negative way (gelling, transesterification). Moreover, the majority of metal catalysts are toxic, discolor the adhesive, and are removable from the polymer only by costly and inconvenient precipitations.

Other controlled radical polymerization processes utilize a compound of the formula R'R"N—O—X, for example, as initiator, in which X represents a free radical species which is able to polymerize unsaturated monomers; very specific radical compounds, such as phosphorus-containing nitroxides or specific nitroxyls, for example, which are based on imidazolidine, morpholines, piperazinones, or piperazinediones. In general, however, the reactions exhibit low conversion rates, particularly for the polymerization of acrylates, leading to very low yields and molecular weights, and/or relatively high temperatures are needed in order to shift the equilibrium between the "dormant" and the active radical species to the side of the active species, and in order, thus, to increase the net reaction rate. The choice of solvents is therefore confined essentially to high-boiling solvents.

One suitable method for producing narrow-range polymers is that known as the RAFT procedure (Reversible Addition-Fragmentation Chain Transfer), described for example in specifications WO 98/01478 A1 and WO 99/31144 A1. The procedure described therein is not immediately suited to the production of PSAs, since the conversions achieved are very low and the average molecular weight of the polymers prepared is too low for PSAs, especially those based on acrylate. Consequently, the polymers produced in this way cannot be employed as acrylate PSAs.

Onward developments of this procedure, through the introduction of thioesters or trithiocarbonates, are a topic of research. For instance, EP 1 626 994 A1 describes improved RAFT CTAs, with which it has proved possible to produce polyacrylate PSAs for hotmelt coatings. The RAFT procedure has significant advantages over ATRP and over nitroxyl-controlled polymerization, since there is no need to accept a reduction in reaction rate, nor to use expensive and in some cases unstable catalysts, and the RAFT CTAs are more universal in their usefulness.

Generally speaking, nevertheless, acrylate PSAs obtained by means of sulfur-containing RAFT reagents of these kinds have disadvantages for numerous spheres of use. Polymers prepared with RAFT CTAs, especially (pressure sensitive) adhesives, do in fact have very defined polymer constructions and polydispersities, and can therefore be adjusted very effectively in terms of their technical adhesive properties. As a result of the procedure, the molar masses of the polymers obtainable accordingly are limited, and so in general the polyacrylates prepared do not have the cohesion necessary for (pressure sensitive) adhesives. Rzayev and Penelle addressed the problem of obtaining high molar masses with a narrow molar mass distribution, and show that, while this outcome can in fact be achieved by means of RAFT polymerization, at very high pressures (*Angew. Chem. Int. Ed.* 2004, 43, 1691), the practical implementability is difficult here, and the procedure is much more costly. Zhang et al. have developed a process in which, in the absence of a radical initiator, the polymerization is initiated thermally alone, but as a result of the low concentration of radicals, the reaction rate is very low, meaning that high conversions are obtained only after days (*Polymer* 2006, 47, 6970).

While the cohesion can be adjusted subsequently, via the crosslinking, hotmelt procedures in particular necessitate specific crosslinking methods, as described in DE 10 2004 044 086 A1, US 2003/0 068 492 A1 and EP 1 978 069 A1, and the covalent or coordinative network generated by crosslinking is different in the way it affects the properties of the adhesive than an increase in the molar masses. High concentrations of crosslinker harbor the risk of gelling in the hotmelt procedure, and/or the risk of overcrosslinking.

It is an object of the invention, therefore, to provide a polymerization method which can be used to prepare polyacrylates having a narrow molecular weight distribution, but nevertheless relatively high molar masses, so that the resultant polyacrylate adhesives and adhesive tapes consisting of these polyacrylate adhesives exhibit sufficient cohesion.

Surprisingly it has been found that through the combination of a RAFT procedure with subsequent reaction of the polymers with dienyl compounds, more particularly with bisdienyl compounds, narrow-range polyacrylate PSA systems have been obtained, which exhibit an enhanced cohesion and which may be used—optionally after appropriate additization as adhesives to outstanding effect, more particularly as pressure sensitive adhesives.

The invention therefore relates to a method for preparing acrylate-based polymers, wherein first a controlled radical polymerization reaction of an initial reaction charge comprising at least one acrylate-based monomer, in other words of an acrylate-based monomer or of a monomer mixture comprising at least one acrylate-based monomer, in each case customarily in the presence of solvents, is carried out in the presence of at least one chain transfer agent (CTA) having a functional group S—C=X, where X=S, O or N, with the CTA being selected from the group encompassing dithioesters, i.e., compounds of the general structure

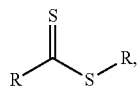

dithiocarbonates, and specifically both the S,S'-substituted dithiocarbonates, i.e., compounds of the general structure

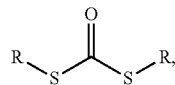

and xanthates (O,S-substituted dithiocarbonates), i.e., compounds of the general structure

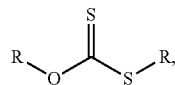

dithiocarbamates, i.e., compounds of the general structure

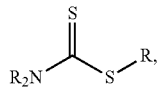

trithiocarbonates, i.e., compounds of the general structure

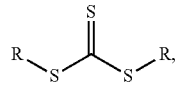

and
imidodithiocarbonates, i.e., compounds of the general structure

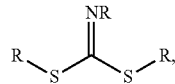

where, above, R generally and independently at each occurrence selectedly represents organic radicals or else, optionally, inorganic radicals (the members of the stated group of CTAs are also referred to in the context of this specification as "RAFT CTAs" or as polymerization regulators).

The majority of the CTA molecules, and more particularly virtually all CTA molecules, are incorporated into the polymer chains that form in such a way that the respective polymer chain has at least one functional group of a CTA incorporated into it. In accordance with the invention, the polymers obtained in this way are contacted with a chemical compound which comprises at least one unit ("diene unit") which has two conjugated double bonds. In the text below, the chemical compound comprising a diene unit is also referred to as "dienyl compound". In accordance with the invention, hetero-Diels-Alder reactions are brought about between the conjugated double bonds of the diene unit of each dienyl molecule and one double bond of the C=X of the functional group S—C=X of each polymer chain, so that the polymer chains in question are linked to the dienyl compound, in accordance with the general scheme

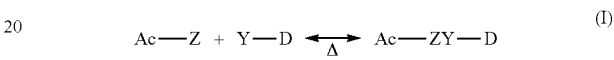

Where the selected framework unit D of the dienyl compound is a relatively long chain, it is possible likewise to bring about molar mass increases in this way. Thus, for example, D as well may be a polyacrylate chain, or block copolymers of the form P(A)-P(B) may be generated, if D differs from Ac. Through a different choice of D, as a short-chain radical or nonpolymeric radical, for instance, it is possible to design further molecules—for example, to attach functional groups onto the polyacrylate Ac.

One very advantageous onward development of this method uses as dienyl compounds, compounds which comprise at least two units ("diene unit"), which in turn each have two conjugated double bonds. The invention accordingly further—and advantageously—relates to a method for preparing acrylate-based polymers, wherein first a controlled radical polymerization reaction of an initial reaction charge comprising at least one acrylate-based monomer is carried out in the presence of at least one CTA with at least one functional group S—C=X, where X=S, O or N, the CTA being selected from the group encompassing dithioesters, dithiocarbonates, dithiocarbamates, trithiocarbonates, imidodithiocarbonates, and xanthates ("RAFT CTAs"), with the majority of the CTA molecules being incorporated into the polymer chains that form, after which the respective polymer chain has the functional group of the incorporated CTA, and at least one chemical compound ("bisdienyl compound"), comprising at least two units ("diene unit"), which in turn each have two conjugated double bonds, is contacted with the polymers thus obtained, so that hetero-Diels-Alder reactions are brought about between the conjugated double bonds of the two diene units of a bisdienyl molecule and one double bond C=X of the functional group S—C=X of each polymer chain, so that at least two polymer chains are linked by means of the bisdienyl molecule.

The method for preparing acrylate-based polymers by means of bisdienyl compounds is therefore distinguished by the fact that first a controlled radical polymerization reaction of an initial reaction charge comprising at least one acrylate-based monomer, in other words of an acrylate-based monomer or of a monomer mixture comprising at least one acrylate-based monomer, in each case customarily in the presence of solvents, is carried out in the presence of at least one chain transfer agent (CTA) having a functional group S—C=X, where X=S, O or N, with the CTA being selected from the group encompassing dithioesters, i.e., compounds of the general structure

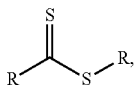

dithiocarbonates, and specifically both the S,S'-substituted dithiocarbonates, i.e., compounds of the general structure

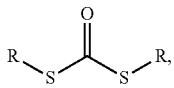

and xanthates (O,S-substituted dithiocarbonates), i.e., compounds of the general structure

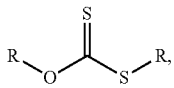

dithiocarbamates, i.e., compounds of the general structure

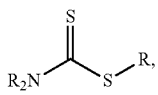

trithiocarbonates, i.e., compounds of the general structure

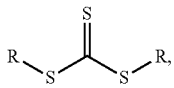

and
imidodithiocarbonates, i.e., compounds of the general structure

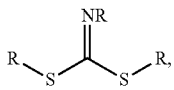

where, above, R generally and independently at each occurrence selectedly represents organic radicals or else, optionally, inorganic radicals (the members of the stated group of CTAs are also referred to in the context of this specification as "RAFT CTAs" or as polymerization regulators).

The majority of the CTA molecules, and more particularly virtually all CTA molecules, are incorporated into the polymer chains that form in such a way that the respective polymer chain has at least one functional group of a CTA incorporated into it. In accordance with the invention, the polymers obtained in this way are contacted with a chemical compound which comprises at least two units which in turn each has two conjugated double bonds. In accordance with the invention, hetero-Diels-Alder reactions are brought about between the conjugated double bonds of the at least two diene units of a bisdienyl molecule and one double bond C=X of the functional group S—C=X of each polymer chain, so that the two polymer chains in question are linked to one another by means of the bisdienyl compound.

The term "initial reaction charge" refers, in the context of this specification, to the starting materials used for the polymerization, which depending on the specific case may be a monomer (for the preparation of homopolymers) or a monomer mixture (for the preparation of copolymers). For the polymerization it is possible, furthermore, for any additional adjuvants (such as initiators, CTAs, and the like) to be present, and additionally, in the case of a solution polymerization or dispersion polymerization, for the solvent or solvents or the dispersion medium or media to be present.

Here and below, the units comprising at least two conjugated double bonds are also referred to as "diene units", and the chemical compound comprising at least one diene unit is referred to as "dienyl compound"; the compounds comprising at least two diene units are also referred to as "bisdienyl compound", and the naming of a compound as "dienyl" or as "bisdienyl" is not intended to rule out the optional possibility of there being more than one or two diene units present in the respective molecule, and accordingly, for the purposes of this specification, multidienyl compounds are also encompassed by the designation dienyl compound or bisdienyl compound, unless something different is maintained in the specific case. Accordingly, bisdienyl compounds are encompassed by the designation "dienyl compound", unless otherwise indicated. The designation "(bis) dienyl compounds", accordingly, embraces dienyl compounds of all kinds, with the bisdienyl compounds enjoying particular preference.

Where reference is made in the context of this specification to a "chemical compound" or a "chemical substance"—such as, for example, even a monomer, a CTA, an initiator, or the like—the reference is not to the individual molecule, but instead to the nature of this chemical compound or substance, i.e., the respective group of identical molecules. Where the individual molecule is meant, the reference will be to the molecule of the corresponding chemical substance (in other words, for example, to a monomer molecule, a CTA molecule, or an initiator molecule, respectively). The expression "two or more chemical compounds" (for example, among other things, two or more monomers, two or more CTAs, and so on) accordingly denotes two or more groups of identical molecules (for example, "two or more monomers" means two or more groups of identical monomer molecules in the respective group, with the monomer molecules differing between the respective groups; "two or more CTAs" means two or more groups of identical CTA molecules in the respective group, with the CTA molecules differing between the respective groups; and so on). Where, in contrast, a functional group is referred to, the reference is to the individual functional group, unless otherwise indicated in the specific case.

The method of the invention permits the preparation of well-defined acrylate polymers, which can be outstandingly employed as adhesives, more particularly as PSAs, or can be processed further to such adhesives/PSAs.

The term, "pressure sensitive adhesive" (PSA) refers, as is customary, to those viscoelastic, polymeric compositions which—optionally as a result of appropriate additization with further components, such as tackifier resins, for example—are durably tacky and permanently adhesive at the application temperature (room temperature unless otherwise defined) and adhere to a multiplicity of surfaces on contact, with adhesion more particularly being instantaneous (which exhibit what is called "tack" [also referred to as stickiness or touch-stickiness]). They are capable, even at the application temperature and without activation by solvent or by heat, but optionally under the influence of a more or less high pressure, of wetting a bonding substrate sufficiently to allow interactions sufficient for adhesion to develop between the composition and the substrate.

The hetero-Diels-Alder reaction between the functional group (Z) from the RAFT CTA and the diene component (Y) that occurs in this case is an equilibrium reaction (see equation (I) above and (II) below). In equations (I) and (II), the abbreviations Ac stand for polyacrylate, ZY for the hetero-Diels-Alder adduct between the diene and the RAFT CTA radical, and D for the framework unit of the dienyl Y-D or of the bisdienyl Y-D-Y.

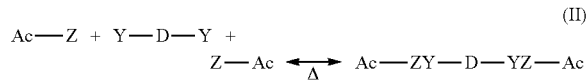

(II)

An increase in the temperature promotes the retro-hetero-Diels-Alder reaction, thereby shifting the equilibrium to the left-hand side of the reaction equation, and causing chains Ac-ZY-D-YZ-Ac that may already have formed to break down again into shorter fragments. In the case of a hotmelt process, therefore, the dienyl compound (more particularly the bisdienyl compound) can be added still in solution before the removal of the solvent, or in the melt, since at the high temperatures required for the transport, processing and coating of the solvent-free polymer, the equilibrium lies on the side of the reactants, the cohesion remains low, and hence there is no disruption to the capacity for further processing. The short polyacrylate chains feature a low melt viscosity, meaning that there are no resulting problems and no resulting substantial differences relative to the regime without the presence of the bisdienyl compound at the melt processing stage. As soon as the melt cools, the equilibrium shifts to the side of the hetero-Diels-Alder adducts. The increase in polyacrylate molar masses that this causes (generally, molecular weights are obtained which are more than twice as high as those of the original polymers) leads to polyacrylates having a significantly increased cohesion.

Very preferably the dienyl compound is selected such that the diene unit is terminal; with more particular advantage, the bisdienyl compound is selected such that at least two of the diene units present are terminally positioned, and so the bisdienyl compound is an α,ω-bisdienyl compound. Since, as a result of the method, the RAFT-CTA radicals incorporated into the polymers are likewise arranged terminally, it is possible in this way to link two polymer chains linearly to one another via an α,ω-bisdienyl compound.

If the scaffold unit D of bisdienyl compound selected is very short-chain (D may in this case be dropped completely if the two diene units border one another directly), it is possible with this reaction to bring about virtually a doubling of the molecular weight of the polyacrylate macromolecules.

In another preferred embodiment of the invention, a polymeric unit is selected for the radical D in equation (I), and so A-B-A triblock copolymers can be prepared (the polymer blocks of type A in this case originate from the polyacrylates Ac obtainable by the RAFT reaction, and the polymer blocks of type B originate from the polymeric unit B of the bisdienyl compound). D here may be selected advantageously from the group of the polystyrenes, polyethylene glycols, polypropylene glycols, silicones, polyurethanes, polyesters, polyamides, polycarbonates, poly(meth)acrylates, natural rubbers, and synthetic rubbers, in a listing which is purely exemplary and not restrictive.

In an onward development of the method of the invention, the bisdienyl compound has more than two diene units. Depending on the construction of the scaffold unit of a bisdienyl compound of this kind, all of the diene units may be provided terminally on polymer arms. By virtue of a corresponding number of hetero-Diels-Alder reactions with a corresponding number of polyacrylate macromolecules, compounds of this kind are outstandingly suitable for the synthesis of star-shaped polymers. By means of bisdienyl compounds having two terminal diene units and one or more diene units which protrude from the scaffold unit, comb polymers can be generated. Through the choice of number and position of the diene units, and also of the character of the scaffold unit of the bisdienyl compound, it is possible to use the method of the invention to generate a multiplicity of branched polymers with different constructions and different molecular weights, which all originate from the polyacrylate macromolecules obtainable by means of the RAFT method.

The invention further provides the polymers obtainable by the method of the invention, more particularly adhesives, preferably pressure sensitive adhesives. The resultant products from the hetero-Diels-Alder reaction with the dienyl compound will have in each case at least one cyclo-1-X-hex-3-ene unit in the polymer chains with X=S, O and/or N. As a result of the reaction with the bisdienyl compounds, the polymers obtained, more particularly the adhesives or PSAs, have at least two cyclo-1-X-hex-3-ene units in the polymer chains. The hex-3-ene subunits may optionally also be substituted by heteroatoms (depending on the diene units used in the (bis)dienyl compounds). Further provided by the invention, accordingly, are acrylate-based polymers, more particularly as adhesive, preferably as pressure sensitive adhesive, which comprise at least one, preferably at least two, cyclo-1-X-hex-3-ene units with X=S, O or N in the polymer chains, more particularly those polymers of this kind that are obtainable by the method of the invention.

As a result of the elevation in the molar mass by means of hetero-Diels-Alder reaction, the cohesion of the polymer obtained may be advantageously increased; a simultaneous decrease in the adhesion—as usually occurs in the case of cohesion increase through the use of crosslinkers—does not arise. For star-shaped polymers prepared accordingly—particularly through use of corresponding multidienyl compounds—there is in fact an increased adhesion found, since these polymers have a greater number of free chain ends. In the case of very branched star-shaped polymers there is in some cases again a (relative) decrease in cohesion, and accordingly the actual cohesion of the end product can also be adjusted via the choice of the degree of branching. As a result, the product properties can be tailored advantageously.

DETAILED DESCRIPTION OF THE INVENTION

The polymerization is initiated advantageously by one or more radical initiators. Suitable radical initiators for the polymerization include, in particular, thermally decomposing initiators, especially radical-forming azo or peroxo initiators. The initiator or initiators are preferably added before and/or in the course of the polymerization. Multiple initiation is preferred, for which a first addition of initiator is made before or at the beginning of the polymerization, and for which at least one further addition of initiator takes place in the course of the polymerization; advantageously, the addition of further initiators is made in at least two method stages. In this case, in each step of addition, it is possible to use the initiator employed first, an initiator already employed before, or a different initiator. Suitable in principle are all customary initiators known for acrylates.

Examples of radical sources are peroxides, hydroperoxides, and azo compounds; a number of nonexclusive examples of typical radical initiators include potassium peroxodisulfate, dibenzoyl peroxide, cumene hydroperoxide, cyclohexanone peroxide, di-tert-butyl peroxide, azo-bis(isobutyronitrile), cyclohexylsulfonyl acetyl peroxide, diisopropyl percarbonate, bis(4-tert-butylcyclohexyl) peroxydicarbonate (Perkadox® 16 from Akzo Nobel), tert-butyl peroctoate, and benzopinacol. In one very preferred version, radical initiators used are 2,2'-azo-bis-(2-methylbutyronitrile) (Vazo 67® from DuPont) and/or 1,1'-azo-bis-(cyclohexanecarbonitrile) (Vazo 88® from DuPont).

It is also possible, furthermore, to use radical sources which release radicals only on irradiation with UV light.

For the thermally decomposing initiators, the introduction of heat is essential to the initiation of the polymerization. The polymerization for the thermally decomposing initiators can be initiated more particularly by heating to 50 to 160° C., depending on initiator type. For the use of UV initiators, UV light of the appropriate wavelength is beamed in. This reaction may be carried out more particularly in a temperature range from 0° C. to 150° C.

In one advantageous development of the method, the polymerization—especially with initiation by at least one radical initiator—is carried out with at least one dithioester and/or trithiocarbonate as polymerization regulator. In one preferred variant of the inventive method, RAFT CTAs used are compounds of the following general structural formula

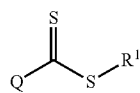
(III)

where Q and $R^1$ are selected independently of one another, and Q is preferably a radical from one of groups a) to n), and $R^1$ is preferably a radical from one of groups a), c) to f), or h):

a) branched and unbranched $C_1$ to $C_{18}$ alkyl, branched and unbranched $C_3$ to $C_{18}$ alkenyl, and branched and unbranched $C_3$ to $C_{18}$ alkynyl radicals
b) ethenyl and ethynyl radicals
c) unfused and fused aryl radicals, especially $C_6$ to $C_{18}$ aryl radicals, more particularly unsubstituted or substituted phenyl radicals, and unsubstituted or substituted benzyl radicals
d) aliphatic heterocyclic radicals, more particularly $C_3$ to $C_{12}$ cycloalkyl radicals
e) aromatic heterocyclic radicals
f) substituted radicals of group a), more particularly
  f1) radicals of group a) each substituted by at least one OH group, halogen atom or silyl ether,
  f2) radicals of group a) each substituted by at least one ester, amine, carbonate, cyano, isocyano and/or epoxide group and/or by sulfur,
g) substituted radicals of group a), more particularly
  g1) radicals of group b) each substituted by at least one OH group, halogen atom or silyl ether,
  g2) radicals of group b) each substituted by at least one ester, amine, carbonate, cyano, isocyano and/or epoxide group and/or by sulfur,
h) $-NH_2$, $-NHR^I$, $-NR^IR^{II}$, $-NH-C(O)-R^I$, $-NR^I-C(O)-R^{II}$, $-NH-C(S)-R^I$, $-NR^I-C(S)-R^{II}$,

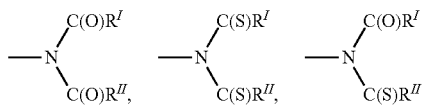

where $R^I$ and $R^{II}$ are radicals selected independently of one another from groups a) to g)
i) $-S-R^I$, $-S-C(S)-R^I$, where $R^I$ is a radical selected from one of groups a) to g),
k) $-O-R^I$, $-O-C(O)-R^I$, where $R^I$ is a radical selected from one of groups a) to g),
l) radicals containing phosphate groups, more particularly $-P(O)(OR^{III})(OR^{IV})$, where $R^{III}$ and $R^{IV}$ are identical or radicals selected independently of one another from groups a) to g),
m) $C_2$ to $C_{18}$ heteroalkyl radicals having at least one O atom and/or at least one $NR^I$ group in the carbon chain, where $R^I$ is a radical selected from one of groups a) to g),
n) hydrogen.

The stated substituent listings serve only as examples of the respective groups of compounds, and make no claim to completeness.

Also suitable as polymerization regulators are compounds of the following types

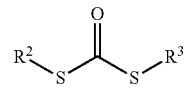
(IV)

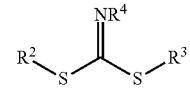
(V)

where $R^2$, $R^3$, and $R^4$ are selected independently of one another from groups a) to m).

In a particularly preferred procedure in accordance with the invention, the following compounds are used as polymerization regulators, where $R^2$, $R^{III}$ and $R^{IV}$ are defined as above.

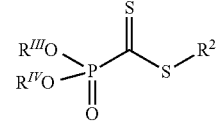
(VI)

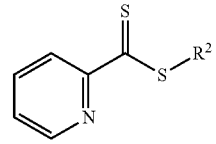
(VII)

With great advantage, the quantity of the RAFT CTAs is selected such that they are employed in total with an (overall) weight fraction of 0.001%-5%, more particularly of 0.025% to 0.25%, based on the monomers.

In the inventive sense, moreover, it is very useful if the molar ratio of radical initiator added first (first step of addition) to the amount of all RAFT CTAs is in the range from 50:1 and 1:1, more particularly between 10:1 and 2:1.

The method is particularly outstandingly suitable for the preparation of acrylate-based polymers, these being those polymers which in part, more particularly predominantly (i.e., to an extent of more than 50 wt %), are attributable to acrylic acid, methacrylic acid, acrylic esters and/or methacrylic esters as monomers (referred to hereinafter collectively as "acrylic monomers") (where reference is made generally, for the purposes of this specification, to "acrylic" or "acrylate", the intention is to include therein the corresponding methyl-substituted derivatives, in other words the methacrylic compounds, unless specifically maintained otherwise). Equally, the expression "(meth)acrylic" embraces the corresponding acrylic compounds and the corresponding methacrylic compounds.

The method is particularly suitable for the preparation of acrylate PSAs. PSAs consist customarily of a polymer component, also referred to as base polymer component, which may be a homopolymer, a copolymer, or a blend of polymers (homopolymers and/or copolymers). The composition of the polymer component may be selected according to the desired properties of the PSA. The base polymer component is customarily admixed with further additions, sometimes to a considerable extent, in order to obtain the desired properties for the end product (the PSA). PSAs are frequently crosslinked, in order to bring about sufficient cohesion.

The starting point advantageously in accordance with the invention is an initial reaction charge, more particularly a monomer mixture, in which there are ethylenically unsaturated compounds, comprising more particularly (meth)acrylic acid and/or derivatives thereof, and this initial reaction charge is polymerized radically via a RAFT process, using RAFT CTAs.

The polymer component of the polyacrylate PSA advantageously comprises one or more polyacrylates obtainable in each case by (co)polymerization of (a1) 70 to 100 wt % of acrylic esters and/or methacrylic esters and/or the corresponding free acids, with the formula

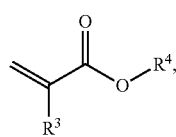

(VIII)

where $R^3$=H and/or $CH_3$, and $R^4$=H and/or alkyl chains having 1 to 30 C atoms, with (a2) 0 to 30 wt % of olefinically unsaturated monomers with functional groups.

The weight figures are based on the respective polyacrylate.

Used preferably for the monomers (a1) are acrylic and/or methacrylic esters with alkyl groups having 1 to 14 C atoms. These acrylic monomers may be selected exemplarily and advantageously from the following list, encompassing methyl acrylate, methyl methacrylate, ethyl acrylate, ethyl methacrylate, propyl acrylate, propyl methacrylate, n-butyl acrylate, n-butyl methacrylate, n-pentyl acrylate, n-hexyl acrylate, n-hexyl methacrylate, n-heptyl acrylate, n-octyl acrylate, n-nonyl acrylate, lauryl acrylate, stearyl acrylate, stearyl methacrylate, behenyl acrylate, and the corresponding branched isomers, such as 2-ethylhexyl acrylate, for example. Other classes of compound for use, which may likewise be added in small amounts under (a1), are cyclohexyl methacrylates, isobornyl acrylate, and isobornyl methacrylates.

Used exemplarily and preferably for (a2) are monomers of the following list, encompassing maleic anhydride, itaconic anhydride, glycidyl methacrylate, benzyl acrylate, benzyl methacrylate, phenyl acrylate, phenyl methacrylate, tert-butylphenyl acrylate, tert-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, and tetrahydrofurfuryl acrylate, hydroxyethyl acrylate, 3-hydroxypropyl acrylate, hydroxyethyl methacrylate, 3-hydroxypropyl methacrylate, 4-hydroxybutyl acrylate, 4-hydroxybutyl methacrylate, allyl alcohol, itaconic acid, acrylamide, and cyanoethyl methacrylate, cyanoethyl acrylate, 6-hydroxyhexyl methacrylate, N-tert-butylacrylamide, N-methylolmethacrylamide, N-(butoxy-methyl)methacrylamide, N-methylolacrylamide, N-(ethoxy-methyl)acrylamide, N-isopropylacrylamide, vinylacetic acid, β-acryloyloxypropionic acid, trichloroacrylic acid, fumaric acid, crotonic acid, aconitic acid, dimethylacrylic acid, 4-vinylbenzoic acid, this enumeration not being conclusive.

Also used preferably for the component (a2) are aromatic vinyl compounds, in which the aromatic nuclei are based preferably on $C_4$ to $C_{18}$ units, but may also contain heteroatoms. Particularly preferred examples are styrene, 4-vinylpyridine, n-vinylphthalimide, methylstyrene, and 3,4-dimethoxystyrene, this enumeration not being conclusive.

For the polymerization, the monomers are selected such that the resultant polymers can be employed as thermally crosslinkable PSAs, more particularly such that the resulting polymers possess pressure-sensitively adhesive properties in line with the "Handbook of Pressure Sensitive Adhesive Technology" by Donatas Satas (van Nostrand, N.Y. 1989).

The nature of the comonomers is selected such that the glass transition temperature $T_{g,A}$ of the polymers (glass transition temperatures are understood for the purposes of this specification to be the static glass transition temperatures as determinable via Differential Scanning calorimetry (DSC) in accordance with DIN 53765; the figures for the glass transition temperature $T_g$ in the context of this specification relate to the glass transformation temperature value Tg in accordance with DIN 53765:1994-03, unless specifically indicated otherwise) is below the application temperature, preferably at $T_{g,A} \leq 15°$ C. In order to achieve this, furthermore, the quantitative composition of the monomer mixture is advantageously selected such that in accordance with the Fox equation (E1) (cf. T. G. Fox, Bull. Am. Phys. Soc. 1956, 1, 123), the desired $T_{g,A}$ value for the polymer is obtained.

$$\frac{1}{T_g} = \sum_n \frac{W_n}{T_{g,n}} \quad (E1)$$

In this equation, n represents the serial number of the monomers used, $W_n$ the mass fraction of the respective monomer n (wt %), and $T_{g,n}$ the respective glass transition temperature of the homopolymer of the respective monomer n in K.

The polymerization may be carried out in bulk, in the presence of one or more organic solvents, in the presence of water, or in mixtures of organic solvents and water. The aim is to minimize the amount of solvent used. Examples of suitable organic solvents are pure alkanes (e.g., hexane, heptane, octane, isooctane), aromatic hydrocarbons (e.g., benzene, toluene, xylene), esters (e.g., ethyl acetate, propyl, butyl, or hexyl acetates), halogenated hydrocarbons (e.g., chloro-benzene), alkanols (e.g., methanol, ethanol, ethylene glycol, ethylene glycol monomethyl ether), ketones (e.g., acetone, butanone), and ethers (e.g., diethyl ethers, dibutyl ethers), or mixtures thereof. The aqueous reaction systems for aqueous polymerization reactions may be admixed with a water-miscible or hydrophilic cosolvent, in order to ensure that the reaction mixture is present in the form of a homogeneous phase during monomer conversion. Cosolvents for the present invention are selected preferably from the following group, consisting of aliphatic alcohols, glycols, ethers, glycol ethers, pyrrolidines, N-alkyl-pyrrolidinones, N-alkylpyrrolidones, polyethylene glycols, polypropylene glycols, amides, carboxylic acids and salts thereof, esters, organic sulfides, sulfoxides, sulfones, alcohol derivatives, hydroxyether derivatives, aminoalcohols, ketones, and the like, and also derivatives and mixtures thereof.

Depending on conversion and temperature, the polymerization time is customarily between 4 and 72 hours. The higher the reaction temperature that can be selected, in other words the higher the thermal stability of the reaction mixture, the lower the reaction time that can be selected.

Before the hetero-Diels-Alder reaction, the polymers prepared preferably have a weight-average molecular weight $M_w$ of 50 000 to 600 000 g/mol, more preferably between 100 000 and 500 000 g/mol (the statement of average molecular weights $M_w$ and $M_n$ and of polydispersities P refers to the determination by means of size extrusion chromatography [gel permeation chromatography, GPC]; calibration: PMMA standards [polymethyl methacrylate calibration]). Depending on reaction regime, the acrylate PSAs produced by this method possess a polydispersity P of $M_w/M_n < 4.5$. The method of the invention is more preferably carried out such that the molecular weight distribution of the polyacrylates prior to the hetero-Diels-Alder reaction features a polydispersity of 2 to 3.5.

Also included in the subject matter of the invention is the reaction of the functional groups in the polymerization product that come from the RAFT CTAs with the (bis)dienyl compounds subject to hetero-Diels-Alder mechanisms, with an increase in the molar mass of the polymers. In the case of bisdienyl compounds, the average chain length of the extended macromolecules here is at least twice as high as the average chain length of the polymerization products, since at least two polyacrylate macromolecules have been linked to one another. This leads, correspondingly, to at least a doubling in the average molar mass.

Surprisingly it has been found that through the use of (bis)dienyl compounds an effective increase is possible in the molar mass of polyacrylates, which is easy to bring about in process terms, with no significant attendant deterioration in the polydispersity. Particularly suitable are α,ω-bisdienyl compounds. The technique of molar mass increase via (bis)dienyl compounds is especially suitable for operations in which the polyacrylates are processed in the melt (known as hotmelt operations), since the thermal reversibility of the reaction means that there are no resultant increased melt viscosities; instead, after cooling of the melt, the reaction partners react with one another again and hence the at least doubling in the molar mass of the polymers leads to adhesives featuring enhanced cohesion.

As a positive effect of the hetero-Diels-Alder reactions, a discoloration of the polymers, which through the RAFT reagents and/or byproducts and elimination products which arise during the preparation or reaction of the RAFT reagents, is significantly minimized and in some cases completely decolorized (owing to the chromophoric centers of the functional groups—which feature, in particular, sulfur atoms, optionally oxygen or nitrogen atoms contained conjugated double bonds—a corollary of the nature of the RAFT CTAs is that the resulting polymers generally have a relatively severe yellow to brown discoloration, which for a large number of applications in the adhesive tape segment is intolerable). The odor of the sulfur compounds as well is in part reduced, so that it is no longer perceived as a nuisance in the product.

The conjugated diene or dienes here may be added (admixed) advantageously to the resulting polymers, more particularly at a time at which the polymerization is largely or already completely at an end. This therefore prevents the CTAs losing their activity as a result of hetero-Diels-Alder reactions, where this activity is still necessary for the polymerization.

The method of the invention for increasing the molar mass and hence for boosting the cohesion of the polymers takes place preferably in solution or in the melt, but may also be carried out in dispersions. The reaction may run thermally and/or photochemically. The reaction for the increase in molar mass is carried out preferably at temperatures up to 120° C., more preferably under mild conditions up to 40° C. In order to be able to proceed at low temperatures, it is in some cases necessary to use as catalyst a Lewis acid (for example, $ZnCl_2$) or a Brønsted acid (trifluoroacetic acid, p-toluenesulfonic acid).

The retro-hetero-Diels-Alder reaction takes place preferably at temperatures at or above 100° C., more preferably at or above 120° C., and so the polymers prepared by the method of the invention (more particularly adhesives, such as PSAs) are also suitable for applications at relatively high temperatures. The maximum application temperatures ought in this context to lie preferably at least 20° C. below the temperature of the retro-hetero-Diels-Alder reaction, since otherwise there may be weaknesses with regard to the cohesion.

Suitable in accordance with the invention are all diene components able to enter into a hetero-Diels-Alder reaction with the double bonds C=X of the functional groups S—C=X from the RAFT reagents, more particularly in the polymer chains, as dienophile, as is shown schematically below:

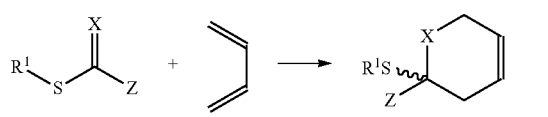

(IX)

Also contributing to the decolorizing are Diels-Alder reactions which proceed with the corresponding groups C=X in byproducts and superfluous CTA residues from the polymerization.

The activity of the conjugated dienes in terms of the functional groups originating from the CTAs can be determined by the skilled person by means of familiar considerations, without undue effort, as for instance by means of the Woodward-Hoffmann rules or using HOMO-LUMO approaches, and also, in the case of cyclic dienes, by approaches involving the reduction of ring strain. These theories are described comprehensively in numerous textbooks, and belong to the knowledge bank of the skilled person.

The dienes are very preferably selected such that they are also capable of binding thiols—which occur frequently as byproducts and usually are responsible for, or at least contribute to, the odor—by means of hydrothiolation and/or thiol-ene reaction.

The bisdienyl compounds have at least two diene units per compound, which advantageously are present terminally on the bisdienyl structure [see above unit D in the scheme of formula (II)]. The diene units [identified by Y in the above scheme (II)] may be selected identically or else differently. With different diene units, for example, the rate of the reaction may be varied with the individual diene units of a bisdienyl, so that one diene unit reacts more quickly with the functional group of the RAFT CTA incorporated into the polymer [Z in the scheme (II)] than the other diene unit.

The diene units of the (bis)dienyl compounds are preferably selected from the list of acyclic and cyclic compounds having two conjugated double bonds, and so these compounds, in the case of bis- or multidienyl compounds in each case two or more of these compounds, are present with substitution by the dienyl parent structure (Y). Particularly preferred is the use of electron-deficient acyclic or cyclic compounds—more particularly having two or more diene units per molecule. Examples of the diene units of the invention are (bonded correspondingly to the dienyl parent structure (Y)) 1,3-butadienes, 1-methoxy-1,3-butadienes, 2,4-hexadienes, (2E)-2,4-pentenedienoic acid and its esters, sorbic acid and its esters, 2,4-hexadiene-1,6-dicarboxylic acid and its esters, 1,3-cyclohexadienes, 1-methoxy-1,3-cyclohexadienes, anthracene, substituted and unsubstituted furans, substituted and unsubstituted thiophenes. Particularly preferred are substituted and unsubstituted cyclopentadienes, (E)-1-methoxy-3-trimethylsilyloxy-1,3-butadiene (Danishefsky diene), 1-(trimethylsiloxy)-1,3-butadienes, 1-(triethylsiloxy)-1,3-butadienes, and (1E,3Z)-1-methoxy-2-methyl-3-(trimethylsilyloxy)-1,3-pentadienes as diene units, more particularly as terminal diene functionalities.

One onward development of the method of the invention utilizes diene functionalities which are produced only in situ, such as o-quinodimethane, for example, which may be prepared, among other ways, by means of metal catalysts from 1,2-bis(chloromethyl)benzene or 1,2-bis(bromomethyl)benzene, and also photochemically by means of UV light from (2,5-dimethylphenyl)(phenyl)-methanone derivatives.

Preference is given to the use of those conjugated dienes (admixed and/or generated in situ) for which the conjugated double bonds in the diene units are not substituted by heteroatoms.

Having proved to be very preferred in the sense of the invention is the combination of a dithioester as RAFT reagent, more particularly a dithioester according to one of the formulae (VI) and/or (VII) above, and a compound modified with one or two cyclopentadiene units as (bis)dienyl compound, more particularly as α,ω-bis-dienyl compound.

Through the appropriate choice of the RAFT CTAs and of the mono-, di-, or poly-functional dienyl compounds, it is possible to shift the equilibrium of the hetero-Diels-Alder reaction in such a way that processing in the melt is possible, and the products produced from the polymers, more particularly adhesive products, particularly pressure-sensitive adhesive products, nevertheless exhibit sufficient cohesion even at elevated temperatures.

Moreover, the chain extension reaction allows a further problem of controlled RAFT polymerization to be done away with. Owing to the chromophoric centers of the functional groups (which have conjugated double bonds containing sulfur atoms), a corollary of the nature of the RAFT CTAs is that the polymers have in general a relatively severe yellow to brown discoloration, which for a multiplicity of applications, especially in the adhesive tape segment, is intolerable. Moreover, sulfur fragments that are present inevitably in the polymers as a result of their preparation, and also byproducts and superfluous CTA residues, may have a very unpleasant odor, and are usually themselves colored. Through the reaction of the chromophoric centers in the hetero-Diels-Alder reaction, the discoloration of the polymers, caused by the RAFT reagents and/or byproducts and elimination products that arise during the preparation or reaction of the RAFT reagents, is significantly minimized and in some cases removed completely, without substantial change to the adhesive properties of the composition. The odor of the sulfur compounds as well is in part reduced, and so is no longer perceived as a nuisance, or is not perceived at all, in the product.

The invention additionally provides the polymers, more particularly adhesives, preferably pressure sensitive adhesives, that are obtained by the method of the invention.

Through the hetero-Diels-Alder reactions, the polymers obtained, more particularly the adhesives or PSAs, have cylco-1-X-hex-3-ene units in the polymer chains, and the hex-3-ene subunit may optionally also be substituted by heteroatoms (depending on the conjugated dienes used). Further provided by the invention, therefore, are acrylate-based polymers, more particularly in the form of adhesive, preferably pressure sensitive adhesive, which comprise cyclo-1-X-hex-3-ene units with X=S, O or N in the polymer chains, more particularly those polymers of this kind that are obtainable by the method of the invention. The majority of these polymers will have one, two or more such cyclo-1-X-hex-3-ene units per polymer chain, depending on the mono-, bis-, or multidienyl compounds used, respectively.

According to adhesive or self-adhesive properties already present, the polymers of the invention, as already indicated, may be used very effectively as adhesives, more particularly as PSAs, or may be further-processed to such, since their polymer structure and the polydispersity can be controlled very effectively and hence the technical adhesive properties can be tailored to the intended end use. As a result of the chain extension, on the one hand, outstanding processing from the melt is possible; on the other hand, the cohesion of the finished products can be advantageously increased even without subsequent crosslinking reactions. Subsequent crosslinking reactions may further boost this effect. Since the decolorizing reaction of the invention causes no substantial alteration to the composition of the polymer, the properties of the adhesive are unaffected.

For use in particular as PSAs, the base polymer component (or the already partly blended PSA) may be admixed with customary additives that are useful for obtaining and/or improving the pressure-sensitive adhesion properties, or with additives useful for obtaining and/or improving other properties.

It is possible in particular, accordingly, to admix resins, more particularly tackifying resins. Tackifying resins which can be used are, for example, the tackifier resins that are known and are described in the literature. In general it is possible to use all resins that are compatible (soluble) with the corresponding adhesive, reference being made more particularly to all aliphatic, aromatic, and alkyl-aromatic hydrocarbon resins, hydrocarbon resins based on pure monomers, hydrogenated hydrocarbon resins, functional hydrocarbon resins, and natural resins. Examples include the pinene resins, indene resins, and rosins, their disproportionated, hydrogenated, polymerized, and esterified derivatives and salts, the aliphatic and aromatic hydrocarbon resins, terpene resins and terpene-phenolic resins, and also C5, C9 and other hydrocarbon resins. Combinations of these and further resins may be used specifically in order to bring the properties of the resultant adhesive into line with requirements.

It is optionally possible, moreover, for plasticizers (plasticizing agents), fillers (e.g., fibers, carbon black, zinc oxide, titanium dioxide, chalk, solid or hollow glass beads, microbeads of other materials, silica, silicates), nucleators, expandants, compounding agents and/or aging inhibitors, in the form, for example, of primary and secondary antioxidants or in the form of light stabilizers, to be added.

Compatible crosslinker substances may be added in order to generate crosslinking. Examples of suitable crosslinkers include metal chelates, polyfunctional isocyanates, polyfunctional epoxides, polyfunctional aziridines, polyfunctional oxazolines, or poly-functional carbodiimides. Polyfunctional acrylates as well may be used with advantage as crosslinkers for actinic irradiation.

In the context of the use of the polymers obtainable in accordance with the invention as adhesives, more particularly as pressure sensitive adhesives, it is appropriate for them to be made available in the form of an adhesive tape, applied to one or both sides of a carrier. The adhesive tapes may have further layers, such as, for instance, further carrier layers, functional layers, or the like.

For the anchoring of the PSA on the carrier or on another substrate it may be an advantage if the composition and/or the substrate is treated, prior to coating, by corona or plasma. Examples of apparatus suitable for atmospheric plasma treatment include those from Plasmatreat.

For processing and for the anchoring of the layer of (pressure sensitive) adhesive with further possible layers, such as carriers, for example, such as a film based on polyester, polyamide, polymethacrylate, PVC, etc., for example, or with a viscoelastic foamed or unfoamed carrier based on polyacrylate or polyurethane, it may further be of advantage for chemical anchoring to take place, via a primer, for example.

The internal strength (cohesion) of the PSA may be boosted further by crosslinking. For PSA use, particular preference is given to employing those polyacrylate-based compositions which are coordinatively or covalently crosslinkable, in order to ensure that the adhesive possesses a constant profile of properties. For crosslinkings of this kind, the prior addition of suitable crosslinkers is advantageous, particularly those of the kind listed earlier on above.

For transport, storage, or diecutting, the single-sided or double-sided adhesive tape is preferably provided on at least one side with a liner, that is, for example, with a silicone-coated film or silicone paper.

A further advantageous embodiment of the invention is the use of a layer of a carrier-free (pressure sensitive) adhesive in the form of a self-adhesive (pressure sensitive) adhesive tape, in other words as what is called an adhesive transfer tape. A carrier-free adhesive is an adhesive which has no permanent carrier. Instead, in a preferred configuration, the self-adhesive composition is applied merely to a temporary carrier, this being material which serves only temporarily for the support and easier application of the self-adhesive composition. Such temporary carriers are also referred to as liners, and may advantageously exhibit a release effect, by means of suitable surface coatings, for instance. For the use of the layer of (pressure sensitive) adhesive for bonding to a substrate surface, the liner is then removed, and the liner therefore does not constitute a productive component.

An (adhesive or nonadhesive) polymer layer of the invention of this kind may be produced from solution and also from the melt. For the latter case, suitable production procedures include both batch processes and continuous processes. Particularly preferred is the continuous manufacture by means of an extruder with subsequent coating directly on a liner with or without a layer of adhesive.

The polymer layer of the invention can be produced in various thicknesses, including, in particular, with a layer thickness of at least 25 μm, preferably of at least 100 μm, more preferably of at least 200 μm.

The invention is elucidated in more detail below by a number of examples, without the invention being restricted as a result.

EXAMPLES

Test Methods

The following test methods were employed in order to evaluate both the technical adhesive properties and the general properties of the PSAs prepared.

ESI-MS Measurements (Test A)

Mass spectra were recorded on a LXQ mass spectrometer (ThermoFisher Scientific, San Jose, Calif., USA), equipped with an atmospheric pressure ionization source in the nebulizer-assisted electrospray mode. The instrument was calibrated in a 195-1822 m/z range using a standard containing caffeine, Met-Arg-Phe-Ala acetate (MRFA), and a mixture of fluorinated phosphazenes (Ultramark 1621) (all from Sigma-Aldrich). A constant spray voltage of 3.5 kV and a dimensionless sweep gas of 8 and also a carrier gas flow rate of 2 were set. The capillary voltage, the lens voltage, and the capillary temperature were 60 V, 120 V, and 275° C.

Gel Permeation Chromatography GPC (Test B)

The average molecular weights $M_n$ and $M_w$ and the polydispersity P were determined using gel permeation chromatography. The eluent employed was THF with 0.1 vol % of trifluoroacetic acid. Measurement was carried out at 25° C. The preliminary column used was PSS-SDV, 5μ, 103 Å ID 8.0 mm×50 mm. Separation took place using the columns PSS-SDV, 5μ, 103 and also 105 and 106 each with ID 8.0 mm×300 mm. The sample concentration was 4 g/l, the flow rate 1.0 ml per minute. Measurement was made against PMMA standards.

NMR Measurements (Test C)

The structures of the compounds synthesized were verified by means of $^1$H NMR and $^{13}$C NMR spectroscopy (Bruker AM 400 MHz spectrometer for hydrogen nuclei and 100 MHz for carbon nuclei). All samples were dissolved in CDCl$_3$. The δ scale is measured against tetramethyl-silane (δ=0.00) as internal standard.

180° Bond Strength Test (Test D)

A strip 20 mm wide of an acrylate PSA applied as a layer to polyester was applied to steel plates or PE plates. The pressure-sensitive adhesive strip was pressed onto the substrate twice with a 2 kg weight. Immediately thereafter, the adhesive tape was peeled from the substrate at 300 mm/min and at a 180° angle. The steel plates were washed twice with acetone and once with isopropanol. The measurement results are reported in N/cm and are averaged from three measurements. All measurements were carried out at room temperature.

Shear Strength (Test E)

A strip 13 mm wide of the adhesive tape was applied to a smooth steel surface which was cleaned three times with acetone and once with isopropanol. The area of application was 20 mm·13 mm (length·width). Subsequently, with a pressing pressure of 2 kg, the adhesive tape was pressed four times onto the steel support. A 1 kg weight was affixed to the adhesive tape at room temperature. The holding powers measured are reported in minutes, and correspond to the average from three measurements.

Production of the Investigation Specimens and Experimental Investigation

Preparation of bis-2,2'-phenylethyl thiocarbonate

The bis-2,2'-phenylethyl thiocarbonate was synthesized starting from 2-phenylethyl bromide with carbon disulfide and sodium hydroxide in accordance with a procedure from *Synth. Communications* 1988, 18, 1531-1536. Yield after distillation: 72%.

Characterization: $^1$H NMR (400 MHz, CDCl$_3$, δ/ppm): 7.20-7.40 (m, 10H), 1.53, 1.59 (2×d, 6H), 3.71, 381 (2×m, 2H).

The following syntheses for the preparation of diene-terminated systems were carried out in analogy to the procedures from *J. Pol Sci.: Part A: Pol. Chem.* 2009, 47, 6053.

Preparation of hexadien-1-ol Derivatives 1a

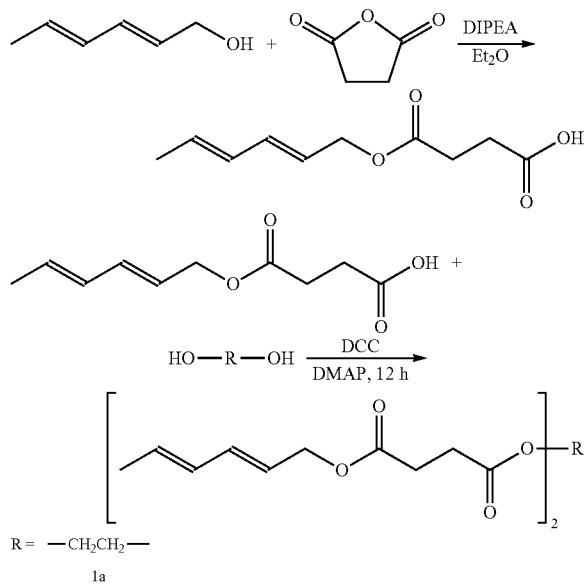

A mixture of trans,trans-2,4-hexadien-1-ol (2.55 g, 26 mmol), succinic anhydride (3.0 g, 30 mmol), and DIPEA (diisopropylethylamine, 3.4 g, 26 mmol) in diethyl ether (10 mL) was stirred at room temperature for two days. The solvent was removed under reduced pressure, the residue was redissolved in dichloromethane, and the solution was washed with 5% strength aqueous citric acid solution. The organic phase was dried over MgSO$_4$. Subsequently ethylene glycol (7.45 g, 0.12 mol), 4-dimethylaminopyridine (1.91 g, 15.6 mmol), and an additional 50 mL of dichloromethane were added, and cooling took place with an ice bath. N,N-Dicyclohexylcarbodiimide (DCC, 24.76 g, 0.12 mol) in solution in 320 ml of dichloromethane was added dropwise, and the resulting solution was stirred at room temperature for 12 hours. The solution was filtered and then the solvent was removed from the filtrate under reduced pressure. The product could be used without further workup.

Characterization: $^1$H NMR (400 MHz, CDCl$_3$, δ/ppm): 6.21 (dd, —CH=CH—), 6.01 (ddq, =CH—CH=), 5.71 (dq, —CH=CH—), 5.58 (dt, —CH=CH), 4.58 (d, —CH$_2$—O), 4.23 (t, 2.64 (t, —CH$_2$—CH$_2$), 1.75 (d, CH$_3$—CH=), M$_n$ (ESI-MS)=414 g/mol.

Preparation of Cyclopentadienyl-Terminated Compounds 2a-e

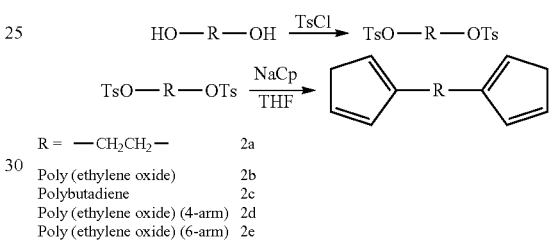

R = —CH$_2$CH$_2$—    2a
Poly(ethylene oxide)    2b
Polybutadiene    2c
Poly(ethylene oxide) (4-arm)    2d
Poly(ethylene oxide) (6-arm)    2e NAOH (1.4 g) was dissolved in 7.5 mL of H$_2$O. A solution of the diol (2.5 mmol) in 6.2 mL of THF was slowly added. The resulting mixture was cooled with an ice bath and subsequently a solution of p-toluenesulfonyl chloride (TsCl, 4.3 g, 2.2 mmol) in 6.2 mL of THF was added dropwise. The mixture was stirred at room temperature overnight and then extracted with dichloromethane. The organic phase was washed three times with water and dried over MgSO$_4$, filtered and concentrated. The product was precipitated with cold diethyl ether. The tosylated diol was redissolved in 30 mL of absolute THF, and cooled to 0° C. in an ice/salt bath. The solution was subsequently admixed slowly dropwise with 6 equivalents of a cyclopentadienylsodium solution (2.0 M in THF). The mixture was stirred at room temperature overnight, after which the precipitate formed was isolated by filtration. The precipitate was washed with THF and the filtrate was concentrated under reduced pressure. The respective product was precipitated from cold diethyl ether.

The diols used were as follows: a) ethylene glycol, b) polyethylene oxide) (Cas No. 25322-68-3, M$_n$=4000 g/mol, Sigma-Aldrich), c) polybutadiene bis-hydroxy-terminated (CAS No. 69102-90-5, Sigma-Aldrich), d) poly(ethylene oxide), 4-arm, hydroxy-terminated (M$_n$=10 000 g/mol, Sigma-Aldrich, catalogue number: 565709), e) poly(ethylene oxide), 6-arm, hydroxy-terminated (M$_n$=17 000 g/mol, Sigma-Aldrich, catalogue number: 570273).

Characterization:

2a: $^1$H NMR (400 MHz, CDCl$_3$, δ/ppm): 6.47-6.08 (m, C$_5$H$_5$, vinylic), 2.95 (m, —O—CH$_2$—CH$_2$—), 2.71 (m, ring-CH$_2$—), M$_n$ $_{(ESI-MS)}$=190 g/mol.

2b: $^1$H NMR (400 MHz, CDCl$_3$, δ/ppm): 6.47-6.08 (m, C$_5$H$_5$, vinylic), 2.95-2.65 (m, —O—CH$_2$—CH$_2$—), 2.71 (m, ring-CH$_2$—), M$_n$ (GPC)=4150 g/mol.

2c: $^1$H NMR (400 MHz, CDCl$_3$, δ/ppm): 6.47-6.08 (m, C$_5$H$_5$, vinylic cyclopentadiene), 5.75-4.90 (m, vinylic polybutadiene), 2.95-2.65 (m, —O—CH$_2$—CH$_2$—), 2.71 (m, ring-CH$_2$—), 2.15-2.03 (m, polybutadiene), 1.43-1.20 (polybutadiene), M$_n$ (GPC)=2950 g/mol.

2d: $^1$H NMR (400 MHz, CDCl$_3$, δ/ppm): 6.47-6.08 (m, C$_5$H$_5$, vinylic), 2.95-2.65 (m, —O—CH$_2$—CH$_2$—), 2.71 (m, ring-CH$_2$—), M$_n$ (GPC)=10 150 g/mol.

2e: $^1$H NMR (400 MHz, CDCl$_3$, δ/ppm): 6.47-6.08 (m, C$_5$H$_5$, vinylic), 2.95-2.65 (m, —O—CH$_2$—CH$_2$—), 2.71 (m, ring-CH$_2$—), M$_n$ (GPC)=17 150 g/mol.

Polymerization Pressure Sensitive Adhesive PSA 1

A reactor conventional for radical polymerizations was charged with 32 g of n-butyl acrylate, 442 g of 2-ethylhexyl acrylate, 4.5 g of acrylic acid, 1.40 g of 4-(benzothioylsulfanyl)-4-cyanopentanoic acid (5.00 mmol, Sigma-Aldrich, CAS No. 201611-92-9), and 0.12 g of Vazo 67® (DuPont). After argon had been passed through the reactor for 20 minutes and the reactor had been twice degassed, the reactor was heated to 70° C. with stirring, polymerization was carried out for 16 hours, and thereafter the batch was cooled to room temperature. GPC analysis: (M$_n$=104 000 g/mol, M$_w$/M$_n$=2.09)

Preparation of the Pressure Sensitive Adhesives PSA 2 to PSA 7 by Means of Hetero-Diels-Alder Reaction The polymer solution from the polymerization procedure for pressure sensitive adhesive PSA 1 was admixed with a solution of the bis-dienyl-terminated compounds 1a and also 2a to 2e, at room temperature, and stirred for 2 hours. The reaction mixture with the bis-hexadienyl-terminated compound was stirred at 70° C. for 16 hours and additionally 0.3 wt %, based on the solids content, of ZnCl$_2$ catalyst was added. The quantities were each selected, on the assumption that all reactions proceed quantitatively, such that one equivalent of the bis-dienyl component and two equivalents of the dithioester (starting from the amount used in each case at the beginning of the RAFT polymerization) are mixed with one another.

TABLE 1

Reaction of the dithioester with the bis-dienyl component

| Pressure sensitive adhesive | Dithioester | Bis-diene | M$_n$ [g/mol] | M$_n$/M$_w$ |
|---|---|---|---|---|
| PSA 2 | PSA 1 | 1a | 110 000 | 3.20 |
| PSA 3 | PSA 1 | 2a | 190 000 | 2.21 |
| PSA 4 | PSA 1 | 2b | 201 000 | 2.36 |
| PSA 5 | PSA 1 | 2c | 145 000 | 2.89 |
| PSA 6 | PSA 1 | 2d | 320 000 | 3.86 |
| PSA 7 | PSA 1 | 2e | 509 000 | 4.45 |

From the high polydispersity it can be seen in table 1 that in spite of the addition of a catalyst and at elevated temperatures, the reaction with the hexadienyl-terminated compound 1a took place only to a small extent. The cyclopentadienyl-terminated compounds, in contrast, are significantly more reactive, and the nature of the diol is able apparently to influence the reaction (see reaction with polyethylene oxide) 2b and polybutadiene derivative 2c). Through the use of molecules 2d and 2e with multiple functionality, the molar masses can be increased significantly, but the significantly increased polydispersity reveals that the reaction does not proceed to completion.

Production of the Specimens for the Evaluation of the Adhesive Properties

The respective solutions of the pressure sensitive adhesives PSA 1 to PSA 7 were diluted with acetone to 50%, 0.2 wt %, based on the polymer, of aluminum acetylacetonate (Aldrich, CAS No. 13963-57-0) was added, and the resulting compositions were then coated using a conventional bar coater on a 23 μm PET carrier, followed by drying at 120° C. for 15 minutes. The coatweight was 50 g/m$^2$. The polymer has a reddish coloration. Testing took place subsequently in accordance with test methods D and E.

TABLE 2

Adhesive data

| Example | Bond strength to steel [N/cm] | Bond strength to PE [N/cm] | Holding powers [min] |
|---|---|---|---|
| PSA 1 | 4.5 | 2.5 | 5400 (A) |
| PSA 2 | 4.5 | 2.4 | 5200 (A) |
| PSA 3 | 4.3 | 2.4 | >10 000 (A) |
| PSA 4 | 4.5 | 2.6 | >10 000 (A) |
| PSA 5 | 4.5 | 2.6 | 5600 (A) |
| PSA 6 | 5.3 | 2.7 | 7800 (A) |
| PSA 7 | 5.5 | 3.1 | 2400 (K) |

The examples demonstrated that through the increase in the molar mass by means of hetero-Diels-Alder reaction, the holding powers can be increased, while on the other hand the simultaneous decrease in the adhesion, as in the case of cohesion increase through the use of crosslinkers, was not observed. It is evident, moreover, that the star-shaped polymers exhibit increased adhesion by virtue of the greater number of free chain ends, and that, in the case of the 6-arm star, the cohesion falls again (cohesive fracture rather than adhesive fracture). This goes hand in hand with the strong interentanglement tendency of multiarm star polymers, and the resultant greater shielding of the acrylic acid groups, which are then in part no longer accessible for the crosslinker.

The invention claimed is:

1. A method for producing a pressure sensitive acrylate-based adhesive polymer having a glass transition temperature $T_{g,A}$, of less than, or equal to 15° C., and a polydispersity of 2-3.5, by a process wherein:

first, a controlled radical polymerization reaction of an initial reaction charge comprising at least one acrylate-based monomer is carried out in the presence of at least one chain transfer agent having at least one functional group S—C=X, where X=S, O or N, the chain transfer agent being selected from the group consisting of dithioesters, dithiocarbonates, dithiocarbamates, trithiocarbonates, imidodithiocarbonates, and xanthates, the majority of the chain transfer agent molecules being incorporated into the polymer chains that form, whereby the polymer chains comprise the functional group of the incorporated chain transfer agent and the polymer chains have a weight average molecular weight (Mw) of about 100,000-600,000, and, second, wherein at least one bisdienyl compound comprising at least two diene units which has two conjugated double bonds is contacted with the said polymer chains, and a hetero-Diels-Alder reaction occurs between the conjugated double bonds of the two diene units of each bisdienyl compound and a double bond C=X of the functional group S—C=X of the majority of the polymer chains, so that at least two polymer chains are linked by means of the bisdienyl molecule and thereby forming the pressure-sensitive acrylate-based adhesive polymer.

2. The method as claimed in claim 1, wherein two of the diene units of the bisdisdienyl compound are terminal so that the bisdienyl compound is an α,ω-bisdienyl compound.

3. The method as claimed in claim 1 wherein the polymer of the first step is admixed with at least one chemical compound from which it is possible to generate, in situ, a chemical compound which has at least one conjugated double bond.

4. The method as claimed in claim 1 in which the at least one dienyl compound is not heterosubstituted in its two conjugated double bonds.

5. The method as claimed in claim 1 wherein the diene units of the dienyl and/or bisdienyl compounds are selected independently of one another from the group consisting of 1,3-butadienes, 1-methoxy-1,3-butadienes, 2,4-hexadienes, (2E)-2,4-pentanedienoic acid, sorbic acid and its esters, 2,4-hexadiene-1,6-dicarboxylic acid and its esters, 1,3-cyclohexadienes, 1-methoxy-1,3-cyclohexadienes, anthracene, substituted and unsubstituted furans, substituted and unsubstituted thiophenes, substituted and unsubstituted cyclopentadienes, (E)-1-methoxy-3-trimethylsilyloxy-1,3-butadiene, 1-(trimethylsiloxy)-1,3-butadiene, 1-(triethylsilyloxy)-1,3-butadiene, and (1E,3Z)-1-methoxy-2-methyl-3-(trimethylsilyloxy)-1,3-pentadiene.

6. The method as claimed in claim 1 wherein the chain transfer agent used is a dithioester having one or more heteroaromatic substituents and/or having one or more phosphonate substituents in the acid radical.

7. The method as claimed in claim 6 wherein the chain transfer agent is selected from the following compounds: wherein:

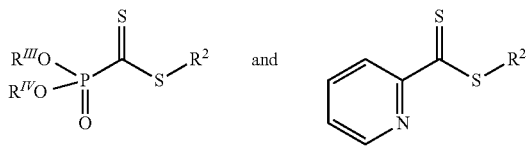

$R^{III}$ and $R^{IV}$ are identical or are different, and are each selected from the following groups a)-g):
a) branched and unbranched $C_1$ to $C_{18}$ alkyl, branched and unbranched $C_3$ to $C_{18}$ alkenyl, and branched and unbranched $C_3$ to $C_{18}$ alkynyl radicals
b) ethenyl and ethynyl radicals,
c) unfused and fused aryl radicals,
d) aliphatic heterocyclic radicals,
e) aromatic heterocyclic radicals
f) substituted radicals of group a),
g) substituted radicals of group a),
and,
$R^2$ is selected from one of the following groups a)-m):
a) branched and unbranched $C_1$ to $C_{18}$ alkyl, branched and unbranched $C_3$ to $C_{18}$ alkenyl, and branched and unbranched $C_3$ to $C_{18}$ alkynyl radicals
b) ethenyl and ethynyl radicals,
c) unfused and fused aryl radicals,
d) aliphatic heterocyclic radicals,
e) aromatic heterocyclic radicals
f) substituted radicals of group a),
g) substituted radicals of group a),
h) —$NH_2$, —$NHR^I$, —$NR^IR^{II}$, —NH—C(O)—$R^I$, —$NR^I$—C(O)—$R^{II}$, —NH—C(S)—$R^I$, —$NR^I$—C(S)—$R^{II}$,

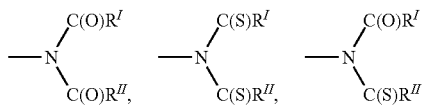

where $R^I$ and $R^{II}$ are radicals selected independently of one another from the groups a) to g) and/or from groups i)-m);
i) —S—$R^I$, —S—C(S)—$R^I$, where $R^I$ is a radical selected from one of the groups a) to g),
k) —O—$R^I$, —O—C(O)—$R^I$, where $R^I$ is a radical selected from one of the groups a) to g),
l) radicals containing a phosphate group,
m) $C_2$ to $C_{18}$ heteroalkyl radicals having at least one O atom and/or at least one $NR^I$ group in the carbon chain, where $R^I$ is a radical selected from one of the groups a) to g).

8. The method as claimed in claim 7, wherein $R^{III}$ and $R^{IV}$ are selected from: c) unfused and fused $C_6$ to $C_{18}$ aryl radicals.

9. The method as claimed in claim 8, wherein $R^{III}$ and $R^{IV}$ are selected from: c) unsubstituted or substituted phenyl radicals.

10. The method as claimed in claim 9, wherein $R^{III}$ and $R^{IV}$ are selected from: c) unsubstituted or substituted benzyl radicals.

11. The method claimed in claim 7, wherein $R^{III}$ and $R^{IV}$ are selected from: d) $C_3$ to $C_{12}$ cycloalkyl radicals.

12. The method claimed in claim 7, wherein $R^{III}$ and $R^{IV}$ are selected from:
f1) radicals of group a) each substituted by at least one OH group, halogen atom or silyl ether, and,
f2) radicals of group a) each substituted by at least one ester, amine, carbonate, cyano, isocyano and/or epoxide group and/or by sulfur.

13. The method claimed in claim 7, wherein $R^{III}$ and $R^{IV}$ are selected from:
g1) radicals of group b) each substituted by at least one OH group, halogen atom or silyl ether, and,
g2) radicals of group b) each substituted by at least one ester, amine, carbonate, cyano, isocyano and/or epoxide group and/or by sulfur.

14. The method according to claim 7, wherein $R^2$ is selected from:
l) —P(O)(OR$^{III}$)(OR$^{IV}$), where $R^{III}$ and $R^{IV}$ are identical or are different, and are each selected from the foregoing groups a) to g).

15. An adhesive composition comprising a pressure sensitive acrylate-based adhesive polymer formed by the method of claim 1.

16. The adhesive composition as claimed in claim 15 wherein the adhesive is a pressure sensitive adhesive.

17. Pressure sensitive acrylate-based adhesive polymers formed by the method of claim 1, wherein the said polymers comprise at least one cyclo-1-X-hex-3-ene unit in the majority of the polymer chains, with X=S, O and/or N.

18. Pressure sensitive acrylate-based adhesive polymers according to claim 17 comprising at least two cyclo-1-X-hex-3-ene units in the majority of the polymer chains, with X selected from the group consisting of: S, O and/or N.

* * * * *